UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

AZO DYE AND PROCESS OF MAKING SAME.

No. 879,053.　　Specification of Letters Patent.　　Patented Feb. 11, 1908.

Application filed October 3, 1907. Serial No. 395,761.

*To all whom it may concern:*

Be it known that we, PAUL JULIUS and ERNST FUSSENEGGER, doctors of philosophy and chemists, subjects of the Emperor of Austria-Hungary, residing at Ludwigshafen-on-the-Rhine, Germany, have invented new and useful Improvements in Azo Dyes and Processes of Making the Same, of which the following is a specification.

In the specification of British Letters Patent No. 25,977 A. D. 1906 is described the production of green coloring matters of the triphenylmethane series by combining an alkylated diamido-benzhydrol with 2.6-dinitro-diphenyl-amin-4.3'-disulfonic acid, or with 2.4-dinitro-diphenyl-amin-6.3'-disulfonic acid, or with a derivative of these acids, in which the second para position to the imido group is only occupied by hydrogen, and then oxidizing the leuco compounds so obtained.

If the aforementioned leuco compounds (which are hereinafter referred to as dinitro compounds of triphenyl-methane derivatives) be treated with a reducing agent, the two nitro groups can be converted into amido groups, the corresponding diamido compounds of triphenyl-methane derivatives being obtained, the simplest representatives of these compounds having respectively the following formulæ:

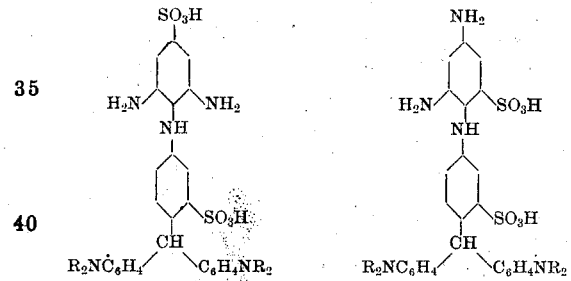

We have further discovered that these diamido compounds of triphenyl-methane derivatives can be combined with diazo compounds yielding azo coloring matters. The diazo compounds which can be used according to our invention may be either of the benzene, or of the naphthalene, series and may contain a sulfonic acid, or a carboxylic acid, or a hydroxyl group, or be otherwise substituted, or not. The azo coloring matters obtained according to our invention are soluble in water and dye unmordanted wool from yellow to brown shades, which are converted into from blue to yellowish green shades of excellent properties upon treatment with bichromate.

The coloring matter which we desire to be understood as claiming specifically is that obtainable by combining diazotized 2.5-dichloranilin with diamido-phenylamido-tetramethyl-diamido-triphenyl-methane-disulfonic acid. It consists of a yellow powder yielding a yellowish brown solution in water and dyeing wool yellow, which shade becomes green upon treatment with bichromate. Upon a reduction with tin and hydrochloric acid it is split up in the normal manner for azo dyes.

The reduction of the dinitro compounds of triphenyl-methane derivatives into the corresponding diamido compounds can be effected, for instance, by means of iron filings in aqueous solution, or suspension, according to the following directions. Stir together five hundred (500) parts of iron filings and two thousand (2,000) parts of water and add, gradually, during a period of two (2) hours, six hundred and seventy-one (671) parts of the leuco compound obtainable by condensing tetra-methyl-diamido-benzhydrol with 2.6-dinitro-diphenyl-amin-4.3'-disulfonic acid, whereupon the temperature rises spontaneously to about seventy-five (75) degrees centigrade. Stir the whole, while maintaining this temperature, until the reduction is complete, which is the case in about from six (6), to ten, (10), hours. Then add one hundred and thirty (130) parts of sodium carbonate and boil until the iron is precipitated, filter this off, add dilute sulfuric acid to the filtrate (if necessary after concentrating the said filtrate by evaporation) until it is just acid to Congo paper, and filter off the diamido compound.

The following examples will serve to illustrate further the nature of this invention and how it can be carried into practical effect, but our invention is not confined to these examples. The parts are by weight.

Example 1. Diazotize sixteen and one-fifth (16.2) parts of 2.5-dichlor-anilin in the usual manner and allow the diazo solution to run, at ordinary temperature and while stirring, into a solution of sixty-one and one-tenth (61.1) parts of the reduced leuco compound prepared from tetra-methyl-diamido-benzhydrol and 2.6-dinitro-diphenyl-amin-4.3'-disulfonic acid, in about four hundred (400) parts of water to which sufficient sodium carbonate has been added to maintain the whole alkaline. The coloring matter separates out as a yellow precipitate. After about half an hour (30 minutes), heat to a temperature of fifty (50) degrees centigrade and filter off and press and dry the coloring matter which consists of a yellow powder easily soluble in water yielding a yellowish brown solution which dyes wool yellowish shades. These shades, upon being treated with bichromate, become green. Concentrated sulfuric acid dissolves the coloring matter yielding a carmin red solution.

Example 2. Diazotize twenty-two and three-tenths (22.3) parts of 1.5-naphthyl-amin-sulfonic acid in the usual manner, and allow the diazo solution to run, at ordinary temperature, while stirring, into a solution of sixty-one and one-tenth (61.1) parts of the reduced leuco compound obtainable from tetra-methyl-diamido-benzhydrol and 2.4-dinitro-diphenyl-amin-6.3'-disulfonic acid, in about four hundred (400) parts of water to which also sufficient sodium carbonate has been added to maintain the whole alkaline. Stir for half an hour (30 minutes), then heat to a temperature of from fifty (50), to sixty (60), degrees centigrade. Precipitate the coloring matter by means of common salt, and filter it off and press and dry it. The coloring matter consists of a brownish red powder which yields a yellowish brown solution in water, and dyes wool brown shades which, upon treatment with a bichromate, are converted into blue-green. It is soluble in concentrated sulfuric acid yielding a violet solution.

Now what we claim is:

1. The process of producing azo coloring matter by combining a hereinbefore defined diazo compound with diamido-phenyl-amido-tetra-alkyl-diamido-triphenyl-methane-disulfonic acid.

2. The process of producing azo coloring matter by combining diazotized 2.5-dichlor-anilin with diamido-phenyl-amido-tetra-methyl-diamido-triphenyl-methane-disulfonic acid.

3. As new articles of manufacture the azo coloring matters which can be obtained by combining a hereinbefore defined diazo compound with diamido-phenyl-amido-tetra-alkyl-diamido-triphenyl-methane-disulfonic acid, which coloring matters are soluble in water and dye unmordanted wool a shade between yellow and brown which is changed into a shade between blue and yellowish green upon treating the material with bichromate.

4. As a new article of manufacture the azo coloring matter which can be obtained by combining diazotized 2.5-dichlor-anilin with diamido-phenyl-amido-tetra-methyl-diamido-triphenyl-methane-disulfonic acid, which coloring matter is soluble in water and dyes unmordanted wool yellow, which shade is changed into green upon treating the material with bichromate.

In testimony whereof we have hereunto set our hands in the presence of two subscribing witnesses.

PAUL JULIUS.
ERNST FUSSENEGGER.

Witnesses:
ERNEST F. EHRHARDT,
J. ALEC. LLOYD.